United States Patent [19]

Breault et al.

[11] Patent Number: 4,652,502
[45] Date of Patent: Mar. 24, 1987

[54] POROUS PLATE FOR AN ELECTROCHEMICAL CELL AND METHOD FOR MAKING THE POROUS PLATE

[75] Inventors: Richard D. Breault, Coventry; John Donahue, Suffield, both of Conn.

[73] Assignee: International Fuel Cells, Inc., South Windsor, Conn.

[21] Appl. No.: 814,423

[22] Filed: Dec. 30, 1985

[51] Int. Cl.⁴ .................................. H01M 2/08
[52] U.S. Cl. ............................. 429/13; 429/36; 429/37; 429/44; 429/185; 29/623.2; 428/194; 427/115
[58] Field of Search ................ 429/13, 35, 36, 41, 429/44, 45, 174, 185, 46, 184, 37; 428/192, 194, 195, 206, 208, 331; 427/113, 115, 122, 369, 372, 264; 29/623.2

[56] References Cited

U.S. PATENT DOCUMENTS

| 2,664,453 | 12/1953 | Lang | 136/121 |
|---|---|---|---|
| 3,779,811 | 12/1973 | Bushnell et al. | 136/86 R |
| 3,855,002 | 12/1974 | Schroll | 136/86 R |
| 3,867,206 | 2/1975 | Trocciola et al. | 136/86 D |
| 3,905,832 | 9/1975 | Trocciola | 136/86 R |
| 3,972,735 | 8/1976 | Breault | 136/122 |
| 3,990,913 | 11/1976 | Tuschner | 429/26 |
| 4,017,663 | 4/1977 | Breault | 429/12 |
| 4,035,551 | 7/1977 | Grevstad | 429/44 |
| 4,038,463 | 7/1977 | Lamarine et al. | 429/44 |
| 4,043,933 | 8/1977 | Breault et al. | 252/182 |
| 4,064,207 | 12/1977 | DeCrescente et al. | 264/29.6 |
| 4,064,322 | 12/1977 | Bushnell et al. | 429/41 |
| 4,080,413 | 3/1978 | Layden et al. | 264/29.2 |
| 4,115,528 | 9/1978 | Christner et al. | 423/449 |
| 4,165,349 | 8/1979 | Sandelli | 264/29.1 |
| 4,173,662 | 11/1979 | Stewart, Jr. | 427/115 |
| 4,185,131 | 1/1980 | Goller et al. | 427/113 |
| 4,185,145 | 1/1980 | Breault | 429/34 |
| 4,219,611 | 8/1980 | Breault | 429/13 |
| 4,233,369 | 11/1980 | Breault et al. | 429/26 |
| 4,245,009 | 1/1981 | Guthrie | 429/16 |
| 4,259,389 | 3/1981 | Vine et al. | 428/192 |
| 4,269,642 | 5/1981 | DeCasperis et al. | 156/89 |
| 4,279,970 | 7/1981 | Breault et al. | 429/35 |
| 4,287,232 | 9/1981 | Goller et al. | 427/113 |
| 4,313,972 | 2/1982 | Goller et al. | 427/113 |
| 4,360,485 | 11/1982 | Emanuelson et al. | 264/29.5 |
| 4,365,008 | 12/1982 | DeCasperis et al. | 429/36 |
| 4,374,906 | 2/1983 | Breault et al. | 429/44 |
| 4,396,480 | 8/1983 | Hegedus et al. | 429/33 |
| 4,426,340 | 1/1984 | Goller et al. | 264/29.1 |
| 4,507,262 | 3/1985 | Karas et al. | 419/2 |

Primary Examiner—Anthony Skapars
Attorney, Agent, or Firm—Gene D. Fleischhauer

[57] ABSTRACT

A porous plate for an electrochemical cell, such as plates 22, 24 having a sealing material disposed in an edge region 41 of the plate is disclosed. Various construction details including a method for making the plate are disclosed which increase the cross pressure material the plate can withstand. In one embodiment, the seal region 41 is impregnated with powder having a low structure and predetermined particle size using a pressurized liquid carrier.

18 Claims, 2 Drawing Figures

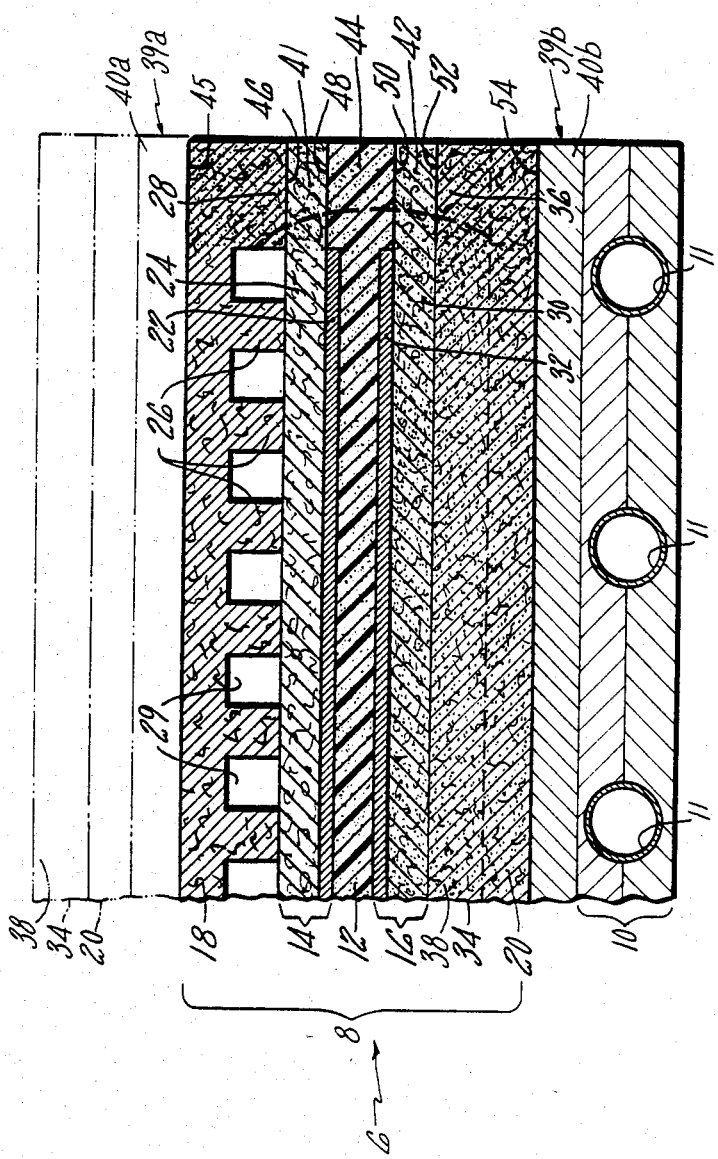

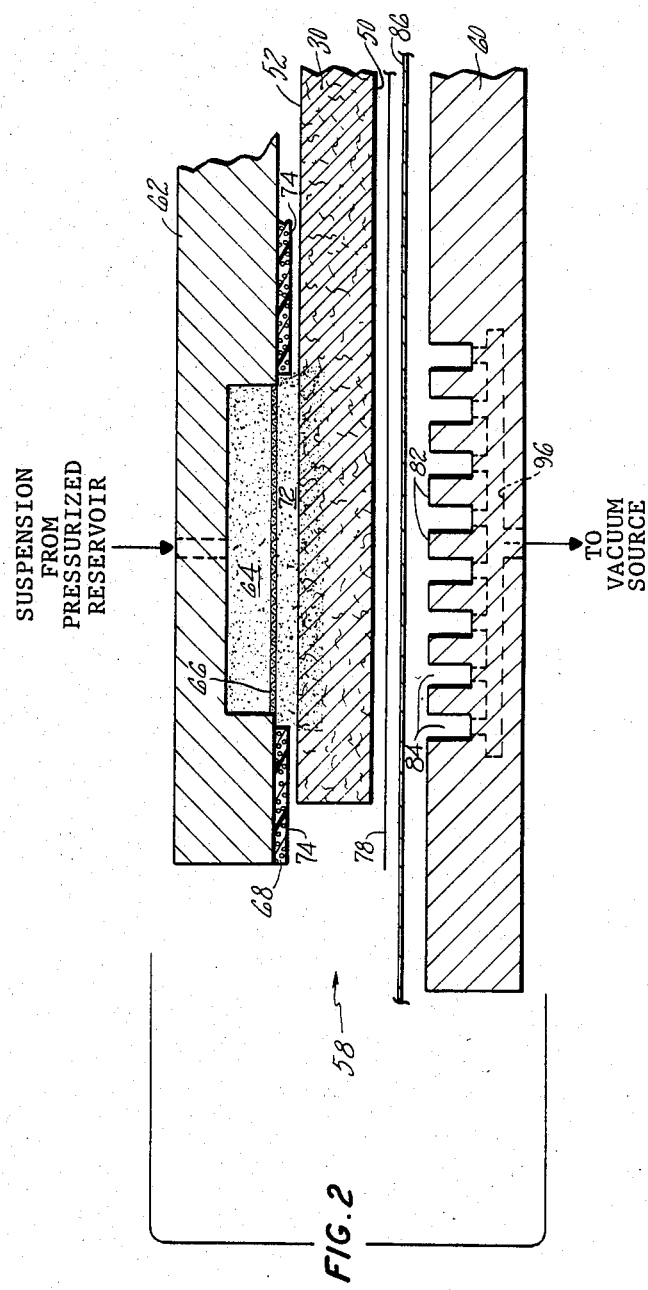

POROUS PLATE FOR AN ELECTROCHEMICAL CELL AND METHOD FOR MAKING THE POROUS PLATE

TECHNICAL FIELD

This invention relates to a wet seal for a porous plate of the type which is used in an electrochemical cell, such as a fuel cell powerplant. Although this invention was developed for use in the field of phosphoric acid fuel cell powerplants, the invention has application to other electrochemical cells employing such seals.

BACKGROUND OF INVENTION

Fuel cell powerplants produce electric power by electrochemically consuming a fuel and an oxidant in one or more electrochemical cells. The oxidant may be pure oxygen or a mixture of gases containing oxygen, such as air. The fuel may be hydrogen.

Each fuel cell generally has electrodes for receiving the gases, such as an anode electrode for fuel and a cathode electrode for an oxidant. The cathode electrode is spaced from the anode electrode and a matrix saturated with electrolyte is disposed between the electrodes.

Each electrode includes a substrate. The substrate has a catalyst layer disposed on the side of the substrate which faces the electrolyte matrix. In some instances, an electrolyte reservoir plate is on the other side of the substrate and is capable of providing electrolyte through small pores to the substrate. These electrolyte reservoir plates may have channels or passageways behind the substrate for carrying a reactant gas, such as gaseous fuel to the anode and gaseous oxidant to the cathode. For example, these channels might extend between parallel ribs on the substrate side of the electrolyte reservoir plate. A separator plate on the other side of the electrolyte reservoir plate provides a barrier to the transfer of electrolyte and prevents mixing of the fuel and oxidant gases in adjacent cells. Another acceptable construction is to have the electrode substrate act both as an electrolyte reservoir plate and as an electrode substrate with channels on the separator side of the substrate.

Generally, a stack of fuel cells and separator plates are used in performing the electrochemical reaction. As a result of the electrochemical reaction, the fuel cell stack produces electric power, a reactant product, and waste heat. A cooling system extends through the stack for removing the waste heat from the fuel cell stack. The cooling system has a coolant and conduits for the coolant. The conduits are disposed in cooler holders to form coolers within the stack. Heat is transferred by the cooler holders from the fuel cells to the conduits and from the conduits to the coolant.

The cooler holder must be electrically and thermally conductive and may be permeable to gas. An example of such a cooler holder is shown in U.S. Pat. No. 4,245,009 issued to Guthrie entitled "Porous Coolant Tube Holder for Fuel Cell Stack". Alternatively, the cooler holder might be impermeable to gas. An examole of such a cooler holder is shown in U.S. Pat. No. 3,990,913 issued to Tuschner entitled "Phosphoric Acid Heat Transfer Material". In Tuschner, the cooler holder serves the double function of cooler holder and separator plate.

Separator plates prevent the mixing of the fuel gas, such as hydrogen, disposed on one side of the plate, with an oxidant, such as air, disposed on the other side of the plate. Separator plates are, therefore, highly impermeable to gases such as hydrogen and highly electrically conductive to pass the electrical current through the fuel cell stack. In addition, separator plates must also tolerate the highly corrosive atmosphere formed by the electrolyte used in the fuel cell. One example of such an electrolyte is hot, phosphoric acid. In addition, separator plates, like cooler holders, must be strong, particularly in terms of flexural strength, which is a measure of the ability of the separator plate to withstand high pressure loads, differential thermal expansion of mating components, and numerous thermal cycles without cracking or breaking.

An example of a method for making separator plates for electrochemical cells is discussed in U.S. Pat. No. 4,360,485 issued to Emanuelson et al., the disclosure in which is hereby incorporated by reference. In this method, the separator plate is formed by molding and then graphitizing a mixture of preferably 50 percent high purity graphite powder and 50 percent carbonizable thermosetting phenolic resin. In particular, Emanuelson discusses forming a well blended mixture of the appropriate resin and graphite powder. The mixture is then distributed in a mold. The mold is compacted under pressure and temperature to melt and partially cure the resin and to form the plate.

Electrolyte reservoir layers, such as are commonly found in electrolyte reservoir plates and as electrode substrates have requirements that differ from those for a separator plate. For example, reservoir layers must accommodate volume changes in the electrolyte during fuel cell operation. Examples of such electrolyte reservoir layers are shown in commonly owned U.S. Pat. Nos. 3,779,811; 3,905,832; 4,035,551; 4,038,463; 4,064,207; 4,080,413; 4,064,322; 4,185,145; and 4,374,906.

Several of these patents show the electrolyte reservoir layer as an electrode substrate. In addition to accommodating changes in acid volume due to electrolyte evaporation and changes in operating conditions of the cell electrode, substrates must satisfy several other functional requirements. For example, the substrate must be a good electrical conductor, a good thermal conductor and have adequate structural strength and corrosion resistance. The substrate provides support to the catalyst layer and provides a means for the gaseous reactants to pass to the catalyst layer. Finally, the edges of the substrate are often required to function as a wet seal to prevent the escape of reactant gases and electrolyte from the cell.

This may be done in the manner described in U.S. Pat. No. 3,867,206 entitled "Wet Seal for Liquid Electrolyte Fuel Cells" issued to Trocciola et al. which is commonly owned with the present invention. Another example is shown in commonly owned U.S. Pat. No. 4,259,389 issued to Vine entitled "High Pressure-Low Porosity Wet Seal". As discussed in Vine, a seal may be formed in the edge seal region of a porous plate by using a powder filler to provide a denser packing to the region which reduces porosity. Nevertheless, this apo- roach has not been widely adopted.

Another approach to forming edge seals is to increase the density of the edge region by compressing the edge region. Densified substrate edge seals are described in commonly owned U.S. Pat. Nos. 4,269,642 and 4,365,008. Experience has shown that the seal density and pore size that can be practically obtained limits the edge seal cross pressure (or, commonly called the bubble pressure) to 3-4 psi. This is lower than the 10 psi desired for a fuel cell stack that operates at 120 psia where pressure differentials between reactants can reach to 5-10 psid.

Accordingly, scientists and engineers are seeking to develop seals for porous plates of an electrochemical which can withstand the higher transient pressures associated with higher pressure fuel cells.

DISCLOSURE OF INVENTION

Some of the latest approaches have followed the Vine approach of impregnating the edge region. These have been only moderately successful. One improved method pursued by the present inventors is to form a suspension of sealing material and to force the suspension into the edge region. However, at solid concentrations required to fill the void structure, the suspension viscosity was too high to obtain full penetration in the thick substrate. At low enough viscosities to obtain good penetrations, the solids content of the suspension was too low to fill the void volume and resulted in large pores.

According to the present invention, a seal region of a porous plate for an electrochemical cell is filled with a high solids, low structure powder in suspension under pressure to form a seal for the porous plate upon removal of the liquid, the seal being able to tolerate transient cross-pressures which are an order of magnitude larger than the cross-pressures encountered during normal operation.

In accordance with the present invention, the method for making the seal is to form a precursor sealing material suspension having a high solids content which is of an amount which avoids gross volume reductions of the sealing material after the liquid is removed from the suspension and filling the seal region by applying pressure to the precursor sealing material which is greater than five (5) pounds per square inch to force the sealing material into the substrate.

A primary feature of the present invention is a porous plate having a seal region with a density which is substantially greater than the density of the plate in a non-sealing region of the plate. One example is an electrode substrate where the seal region has a density which is at least about two-hundred (200) percent of the density of the porous plate in an unsealed region of the plate. Another example is an electrolyte reservoir plate where, because the electrolyte reservoir plate has a much greater density than the substrate, the density of the electrolyte reservoir plate is about one-hundred and fifty (150) percent of the density of the nonsealing region. Another feature of the present invention is the high solids content of the precursor sealing material suspension and the contact between the particles of the sealing material after the vehicle of the suspension is removed. In one embodiment, a feature is an inert binder in the suspension which is present in an amount small enough to avoid substantially changing the hydrophillic nature of the particles and yet provides an adhesive between the particles of sealing material. The sealing material is a powder selected from the qroup consisting of carbon, graphite or silicon carbide or mixtures thereof.

A primary advantage of the present invention is the integrity of an electrochemical cell having an ability to sustain transient cross-pressures between and anode and a cathode which are an order of magnitude larger than normal operating cross-pressures. This results from a seal formed from deposited sealing material having a small pore size through an avoidance of a gross volume reduction in the sealing material as the liquid of the sealing material suspension is removed from a porous plate, such as a substrate, in which the sealing material is deposited.

The foregoing features and advantages of the present invention will become more apparent in light of the following detailed description of the best mode for carrying out the invention and in the accompanying drawings.

BRIEF DESCRIPTION OF THE DRAWINGS

FIG. 1 is a cross-sectional view of a portion of an electrochemical cell stack including electrolyte reservoir layers, such as a substrate or an electrolyte reservoir plate, having sealing material deposited in a seal region.

FIG. 2 is a side elevation view in exploded form for clarity of a apparatus for forcing the precursor sealing material suspension into a porous plate.

BEST MODE FOR CARRYING OUT THE INVENTION

FIG. 1 is a cross-sectional view of a fuel cell powerplant embodiment of the present invention showing a portion of a fuel cell stack 6. The fuel cell stack includes one or more fuel cells as represented by the fuel cell 8 and cooler holders, as represented by the single cooler holder 10, which are spaced at intervals between sets of fuel cells. The cooler holders are adapted to receive conduits 11 for a coolant.

Each fuel cell includes an electrolyte retaining matrix 12 disposed between an anode electrode 14 and a cathode electrode 16. The particular cell shown uses phosphoric acid as the electrolyte. An electrolyte reservoir plate 18 is adjacent the anode and an electrolyte reservoir plate 20 is adjacent the cathode. In an alternate construction, the electrolyte reservoir plates might be replaced by ribbed gas separator plates.

The anode electrode 14 has a catalyst layer 22 and an electrode substrate 24 supporting the catalyst layer. The substrate is a porous plate and acts as a gas permeable reservoir layer for the electrolyte. The catalyst layer is bonded to the substrate and is formed of catalyst particles bonded together with a hydrophobic material such as polytetrafluoroethylene. One such catalyst is platinum supported on carbon particles. The porous electrolyte reservoir plate 18 has ribs 26 and an edge portion 28. The ribs are spaced apart leaving passages 29 for fuel therebetween. A suitable fuel, such as hydrogen, is flowed through the passages 29 between the reservoir layer and the electrolyte reservoir plate and thence to the catalyst layer 22.

Electrolyte transfer between the matrix 12 and both the electrolyte reservoir plate 18 and reservoir layer 24 occurs directly through the pores of the catalyst layer 22 which is partially hydrophilic. The catalyst layer may have holes to aid in this liquid transfer. This distribution of electrolyte within the cell occurs as a result of the capillarity of porous structures (that is, the surface tension phenomenon of the gas-liquid interface) which causes the porous structure to develop capillary forces. The smaller the pore, the larger the capillary force and the greater the liquid retention capability.

The cathode electrode 16, like the anode electrode 14, has a substrate 30 and a catalyst layer 32. The catalyst layer is bonded to the substrate.

The electrolyte reservoir plate 20 adjacent the cathode has a plurality of ribs, as represented by the single rib 34, which are spaced apart to define passages 38 for the oxidant. These passages generally extend perpendicular to the passages 29. An oxidant, such as the oxygen contained in air, is flowed through these passages between the reservoir layer and the electrolyte reservoir plate and thence through the substrate to the catalyst layer.

Separator plate 39a having an edge portion 40a and separator plate 39b having an edge portion 40b are used to separate the adjacent fuel cells. The separator plates prevent the hydrogen, which is flowed along passages 29, from mixing with the oxygen in air flowed along passages 38. The separator plates are highlv impermeable to a gas such as hydrogen and hiqhly electrical conductive to enable electron flow from cell to cell through the stack. The separator plates also block the intercell transfer of electrolyte from reservoir layers within the cell.

Each porous plate having a reservoir layer has a peripheral seal region. For example, the anode substrate 24 has a peripheral seal region 41, the cathode substrate 30 has a peripheral seal region 42, and electrolyte reservoir plates have peripheral sealing regions in the edge region 28 extending parallel to the endmost passage of the passages 29 and in the edge region 36 extending parallel to the endmost passage of the passages 34. Each seal region is filled with a sealing material to adapt the seal region to form a seal with the electrolyte. The sealing material comprises an inert powder selected from the group consisting of carbon, graphite, silicon carbide and mixtures thereof. The powder has a particle size which is less than one micron and a low structure to facilitate dispersal of the powder to the original prime particles to aid in forming a high solid low viscosity suspension. The sealing material increases the density of the seal region of the substrate and decreases the porosity of the plate. Because the pores of the seal region are smaller than the remainder of the plate, the entire volume of the portions remain essentially completely filled with electrolyte as long as the matrix 12 is filled with electrolyte. Liquid seals are thereby formed by sandwiching the sealing portions between the edge portion 40a of the upper gas separator plate and the edge portion 40b of the lower gas separator plate. These liquid seals extend to the surfaces 45, 46, 48, 50, 52, and 54.

As mentioned, the capillarity resulting from the surface tension of a liquid of porous structures causes capillary forces which resist movement of the liquid electrolyte from the pores of the seal region. The smaller the pore, the larger the capillary force at the gas-liquid interface and the ability to resist differences in pressure between the reactant gas in the fuel cell and between any reactant gas and the exterior of the cell. By reason of the method used to fill the seal region with the sealing material, the seal formed in the substrate can resist steady state gas pressures and even transient differences in pressure which can range between 5 and 30 psia.

FIG. 2 is an exploded side elevation view of an apparatus 58 for filling a porous plate of an electrochemical cell, such as the cathode substrate 30 with a sealing material. The apparatus includes a first plate 60 and a second plate 62 each of which is adapted to engage an associated surface (that is, surface 50 or 52) of the substrate. The second plate has an axially extending cavity 64 which is about the axial width of the seal to be formed in the porous plate. The cavity is bounded on three sides by the plate. A screen 66 bounds the cavity on the fourth side. The mesh size of the screen is one hundred. In other embodiments, the screen may be omitted and the plate 62 interchanged with plate 60 such that gravitational force does not act to pull the sealing material suspension from the cavity.

A gasket 68 extends circumferentially about the cavity 64 leaving a flow region 72 therebetween. One satisfactory material for the gasket is a medium closed cell neoprene foam such as COHRlastic foam available from the Auburn Rubber Company of Middletown, Connecticut. The gasket is adapted by a surface 74 to engage the surface 52 of the porous plate.

A translatable belt 86 carries the porous plate into a region between the facing plates. The belt is a Nytex belt available from Nazdar K.C. Coatings, Taerboro, New Jersey and is a nylon monofilament stencil fabric belt approximatelv 7.8 mils thick having a mesh size of 63 with a 48.5% open area. A porous paper 78 is disposed between the belt and the porous plate. The porous paper is a bleached medium felt paper which is commonly available for use in medical offices.

The first plate 60 has a plurality of transversely extending ribs 82 which are spaced apart axially leaving a plurality of gaps 84 therebetween. These gaps are in flow communication through conduit 96 with a vacuum device which decreases the pressure in the gaps 84 during operation for the apparatus shown in FIG. 2. In other embodiments, a vacuum is not created in the gaps 84.

During operation of the apparatus shown in FIG. 2, the porous plate 30 is disposed between the first and second plates 60, 62 by movement of the belt 86 into position. The plates move relative to each other to clamp the porous plate between the two plates. The cavity 64 is in flow communication with a source of the precursor sealing material in suspension form. The suspension is supplied under a significant pressure which is generally greater than ten pounds per square inch across the porous plate.

As the suspension is forced into the porous plate 30, the first plate 60 is placed in flow communication with a vacuum source and draws through the Nytex belt a portion of the suspension. After filling the seal region of the porous plate with the sealing material, the porous plate is moved to location where the fluid can be completely removed by evaporation, such as by heating, leaving behind the deposited sealing material.

The precursor sealing material suspension for the edge region comprises a liquid, such as water, and an inert powder disposed in the liquid such as the carbon, graphite or silicon carbide already mentioned. The powder has a variable particle size which is less than or equal to one micron and a low structure which is determined by the aggregate size and shape, the number of particles per weight of aggregate, and their average mass. The characteristics of structure effect the aggregate packing and the volume of voids in the bulk material. Structure is measured in terms of void volume and, in particular, using the DBPA method to which is assigned a number as set forth in ASTMD 2414 which is promulgated by the American Society for Testing and Materials. The powder is considered to have a low structure if it has a DBPA number which is less than 50 milliliters per 100 grams. The step of forming the precursor sealing material suspension includes adding the powder to the liquid and mechanically agitating the suspension to avoid clumping. Thus, the powder is added to the suspension, the powder is thoroughly mixed and more powder is added to the suspension. A surfactant or dispersant is added to the liquid to increase the wetting of the powder and to aid in the mixing. This process continues until the solids content reaches a level which avoids a gross volume reduction of the sealing material after the liquid is removed from the suspension.

This is important because a gross volume reduction, such as accompanies the material collapsing on itself after the liquid is removed, will result in pore sizes much greater than if the sealing material remains close to the orientation it had when held in place by the liquid. It has been found that a large solids content, typically greater than 60% by weight of the suspension, avoids the gross volume reduction because the particles have enough points of contact such that they support each other and remain in a relatively fixed position even after the liquid is removed.

One empirical method of determining whether a gross volume reduction has occurred is to impregnate a porous plate with an amount of the sealing material by the above method, remove the liquid and fill the material with the electrolyte and then measure the cross-pressure. If the cross-pressure is high, several psi and usually equal to or reater than 5 psi, then the sealing material has not suffered a gross volume reduction.

Thus, the precursor sealing material suspension has a high solids content. The high solids content enables each particle to engage adjacent particles after the liquid is removed from the suspension. As a result, the sealing material has a certain amount of structural rigidity and smaller pores than if the particles did not support each other and could collapse with a gross volume reduction and an enlargement of pore sizes. The small pores exhibit a capillarity characteristic (cross-pressure for a given liquid at a given temperature) for concentrated phosphoric acid at seventy five degrees Fahrenheit which is in excess of five pounds per square inch. A measurement of the capillarity characteristic confirms that the sealing material has not suffered a gross volume reduction.

Another approach for determining the solids content needed to avoid a gross volume reduction in the sealing material which is nearly as certain as the method outlined above, is to form the suspension and evaporate the liquid from the suspension. A resulting residue which maintains it structural form with no large discontinuities in the surface of the residue indicates that a gross volume reduction has been avoided. However, if large cracks appear in the surface, called "mud cracking", it is likely that the solids content of the suspenion is not sufficient to maintain the high cross-pressure across the seal once the seal region is filled with the sealing material.

In addition, a small amount of binder which is inert in the environment of the electrolyte of the fuel cell, such as polytetrafluoroethylene, might be added to the suspension. The binder acts as a further adhesive between particles to increase the structural rigidity of the group of particles. Generally, about up to five (5) percent by weight of the suspension of polytetrafluorethylene will be added to the suspension. It is desirable to avoid using larger amounts of polytetrafluoroethylene because this binder, while inert in the environment of the fuel cell, is hydrophobic and too much of the binder can destroy the ability of the seal to develop high capillary forces with the electrolyte. Again, the amount of permissible polytetrafluoroethylene can be established empirically by forming the seal with a given high solids content and then measuring the cross-pressure the seal can tolerate when containing the electrolyte.

One particular sealing material currently being used having a low structure, submicron carbon powder is a sealing material using Thermax Carbon Powder available from the R. T. Vanderbilt Company, Inc., 30 Winfield Street, Norwalk, Connecticut 06855. The ASTM designation is N-990 and has an typical DBPA of about 35 milliliters per hundred grams according to measurement standard ASTM D-2414. This spherical carbon black may be used in more graphitized form if required for oxidation resistance by heating the matrial to 2,700° C. or greater. Of course, compatible materials such as silicon carbide can be used if the particle size is less than or equal to one micron.

EXAMPLE 1

A precursor sealing material suspension containing about seventy (70) weight percent Thermax carbon black was prepared in the following manner and used with a carbon fiber substrate. Five (5) grams of Triton surfactant (available from the Rohm and Haas Company, Inc., Philadelphia, Pennsylvania) were added to two thousand (2,000) grams of water. Twenty seven hundred (2,700) grams of Thermax carbon black were blended into suspension using a low shear mixer. The amount of Thermax carbon black added was limited by the thickness of the mixture. About half of the mixture was poured into a ball mill and dispersed (that is, broken up to about the prime particle size) for 24 hours. The dispersing action returned the mixture to a liquid condition that allowed adding another three hundred and thirty six (336) grams of Thermax. The mixture was dispersed for another fifty (50) hours then five (5) grams of Triton were added. The additional surfactant enabled adding another four hundred forty three (443) grams of Thermax carbon black. The mixture was returned to the ball mill for 24 hours. After 24 hours of dispersement, the mixture was too thick and five (5) grams of water and five (5) grams of Triton surfactant were added. After about two additional hours of dispersement, a sample was withdrawn from the mixture, evaporated and found to have 67.4% solids. After 24 hours of dispersement by ball milling another one hundred forty three (143) grams of Thermax were added which brought the solids level to 71.8%.

The precursor suspension of Example 1, having a solids content of seventy (70) weight percent and a viscosity of about one thousand (1,000) centipoises, was used to fill a carbon fiber substrate. The substrate was eighty mils (0.080 inches) thick and had a mean pore size of thirty six (36) microns.

The precursor suspension was extruded under a pressure of one hundred pounds per square inch through the screen, through the flow region and into the substrate. After filling, the substrate was dried to remove the water from the suspension. The density of the seal region was two hundred and thirty percent of the density of the substrate before being filled with the precursor suspension. In particular, the density of the seal region was about 1.25 grams per cubic centimeter while the density of the substrate at a point removed from the seal region was fifty five hundredths of a (0.55) gram per cubic centimeter.

The edge seal so formed was filled with phosphoric acid ($H_3PO_4$) by submergence in eighty five (85) weight percent $H_3PO_4$ at 325° F. for 1 hour. The capillarity characteristic of the seal (that is, the cross-pressure or bubble pressure for concentraded phosphoric acid at 75° F.) of this edge seal was measured to be nine (9) psi at 75° F. Other carbon fiber substrates have been impregnated with higher solid content precursor suspensions made as set forth in Example 1, but having a solids content as high as seventy five (75) percent. The resulting density was two hundred and sixty percent of the density of the substrate in a non-seal region. The capillarity characteristic (cross-pressure) of the seal was measured to be thirty pounds per square inch.

EXAMPLE 2

A precursor sealing material suspension containing about seventy four weight percent Thermax carbon black was prepared in a large batch process similar in many ways to the process used in Example 1. The precursor suspension was to fill a graphitized cellulose substrate having a mean pore size of twenty one (21) microns.

The suspension was made in a large batch process in a twenty four hour mix cycle through several additions of decreasing amounts of Thermax carbon black. Because of the large size of the batch (about nine gallons), a production size ball mill was used. This ball mill is manufactured by Paul O. Abbe, Inc., Little Falls, New Jersey.

The large batch process resulted in a better dispersion of the carbon black in suspension (about seventy three percent) with a concomitant increase in the viscosity of the suspension to about six to seven thousand centipoise. Because of the smaller pore size, the viscosity of the precursor suspension was lowered about a third by adding water to reduce the solids content to sixty nine percent, followed by a further dispersion of the suspension. The density of the seal region after drying was one hundred and ninety nine (199) percent (about two hundred percent) of the density of the non-sealing region of the substrate. The capillarity characteristic was eleven and one half (11.5) pounds per square inch for concentrated phosphoric acid at seventy five degrees Fahrenheit.

EXAMPLE 3

A precursor sealing material suspension containing about seventy (70) to about seventy one (71) weight percent carbon black was prepared using a Cowles Dissolver manufactured by the Cowles Dissolver Company, Inc., Cayuga, New York, and a Netzsch moliNEx agitator mill in series. A mixture was formed by mixing together a 12% dispersant, 23% deionized water, and 65% carbon black in the dissolver. The dispersant is a solution of 25% amino methyl propanol, 37.5% dimethyl formamide, and 37.5% of a trade chemical E-902-10-B available from the Inmont Corporation, Clifton, New Jersey. The resulting mixture had a solids content of about 70 to 71 percent. The viscosity was reduced by the addition of water from the viscosity as received from the agitator mill of greater than five thousand centipoise to a viscosity of several thousand centipoise. The addition of water also reduced the solids content from 70 to 71 percent solids content to 64 percent solids content. After completing the operation, the dispersed suspension was used to fill an electrolyte reservoir plate.

In this particular example, the electrolyte reservoir plate had a density 0.91 grams per cubic centimeter. After filling, the edge region of the eleotrolyte reservoir plate had a density of 1.34 grams per cc. An apparatus of the type shown in FIG. 2 was used to force the precursor suspension into the electrolyte reservoir plate because of the small pore size of the electrolyte reservoir plate of about 25 microns and the viscosity of the precursor suspension which was in excess of several thousand centipoise.

After filling the edge region, the electrolyte reservoir plate was dried to remove the liquid from the suspension and to deposit the high solids content mixture in the pores of the electrolyte reservoir plate without a gross volume change of the sealing material. This was confirmed by the high capillarity characteristic of the electrolyte reservoir plate which was thirty (30) psi for highly concentrated phosphoric acid (about 85 to 99 percent phosphoric acid) at 75° F.

During operation of a fuel cell containing an edge seal filled with the sealing material described, the seal material will form an effective seal when wetted by the electrolyte to block the loss of the reactant gases from the fuel cell when the cell is placed in operation even though the transient cross-pressures approach values between five (5) psi and thirty (30) psi. This allows the fuel cell stack to operate at levels of pressure which may result in such pressure differentials between reactants during transient operation of the fuel cell.

Although the invention has been shown and described with respect to detailed embodiments thereof, it should be understood by those skilled in the art that various changes in form and detail thereof may be made without departing from the spirit and the scope of the claimed invention.

We claim:

1. A method of forming an edge seal for a porous plate having a void structure adapted for use in a fuel cell, comprising:

forming a precursor sealing material suspension for the edge seal region comprising a liquid, an inert powder disposed in the liquid, the powder being selected from the group consisting of silicon carbide, carbon, graphite or mixtures thereof, said powder having a low structure which is less than or equal to fifty milliliters per hundred grams and a particle size which is less than or equal to one micron;

filling the seal region by applying pressure to the precursor sealing material which is greater than ten pounds per square inch to force the sealing material into the void structure of the porous plate;

removing the liquid from the suspension to leave the sealing material as a deposit in said substrate;

wherein the solids content of said suspension is of an amount which avoids a gross volume reduction of the sealing material in the void structure after the liquid is removed from the suspension filling the porous plate.

2. The method of forming an edge seal of claim 1 wherein the liquid comprises water having a dispersant or surfactant disposed therein and said solids content is greater than sixty (60) percent.

3. The method of forming an edge seal of claim 2 wherein the water is removed by evaporation.

4. The method of forming the edge seal of claim 1 wherein the liquid consists essentially of water, the dispersant or surfactant and a dispersion of up to about five percent polytetrafluoroethylene by weight of the suspension.

5. In a method of operating an electrochemical cell stack having a plurality of cells disposed adjacent to each other, each cell having a pair of electrodes and an electrolyte matrix extending therebetween, each electrode including a gas porous substrate in contact with said electrolyte filled matrix, the gas porous substrate havinc a seal region, the seal region having disposed therein a sealing material and being filled with electrolyte to form a seal along the edge of the substrate to block the leakage of a reactant gas across the electrolyte filled seal, the improvement which comprises:

employing a seal region having a viad structure and having disposed therein a sealing material comprising an inert powder selected from the group consisting of carbon, graphite, silicon carbide and mixtures thereof, the powder having a low structure and the seal region having a density which is about two hundred (200) percent to about two-hundred and sixty (260) percent of the density of the porous plate in a region which does not contain said inert powder;

operating the fuel cell stack at reactant pressure leval and with a difference in gas pressure across the seal such that the transient differences in gas pressure across the seal are equal to or greater than five pounds per square inch but less than or equal to thirty pounds per square inch.

6. The method of operating an electrochemical cell of claim 5 wherein the sealing material consists essentially of said powder and an amount of inert binder mixed with said powder which does not destroy the hydrophilic nature of the powder.

7. The method of operating an electrochemical cell of claim 6 wherein the binder is up to about five (5) percent polytetrafluoroetheylene by weight of the sealing material.

8. A porous plate for an electrochemical cell having a seal region along at least one edge thereof, wherein the porous plate is clamped by the sealing surfaces of adjacent structures of the cell along the edge of the plate to prevent leakage of gas from the cell, the seal region being in a position to be clamped by the sealing surface of the adjacent structures, wherein the improvement comprises:

a porous plate having a seal region that includes a void structure which adapts the plate to receive a sealing material;

a sealing material comprising an inert powder selected from the group consisting of silicon carbide, carbon, graphite or combinations thereof, said powder having a low structure, having a particle size which is less than or equal to one micron, the sealing material being disposed in the void structure of the seal region of the porous plate to form with the seal region a seal of such thickness and width as to be clamped by the adjacent structure and prevent gas leakage past said seal during fuel cell operation, the sealing having a density which is substantially greater than the density of the plate in a region spaced from the seal region and having a capillarity characteristic of at least five pounds per square inch for concentrated phosphoric acid.

9. The porous plate of claim 8 wherein said sealing material comprises said powder and polytetrafluoroethylene up to about five (5) percent by weight of the powder as a binder.

10. The porous plate of claim 8 wherein the porous plate is an electrolyte reservoir plate and wherein the density of the seal is at least one-hundred and forty percent of the density of said spaced apart region.

11. The porous plate of claim 10 wherein the density of the seal is about 1.1–1.4 grams per cubic centimeter and wherein the density of said spaced apart region is 0.7–1.0 grams per cubic centimeter.

12. The porous plate of claim 8 wherein the porous plate is a substrate for an electrode and wherein the density of the seal is at least 200% of the density of said spaced apart region.

13. The porous plate of claim 12 wherein the density of the seal is about 1.1–1.4 grams per cubic centimeter and wherein the density of said spaced apart region is 0.3–0.6 grams per cubic centimeter.

14. The porous plate of claims 8, 10, or 12 wherein the low structure powder has a low structure index (DBPA) which is less than (50 ml/100 g).

15. The porous plate of claim 6 wherein said low structure index is about 35 ml/100 g.

16. The porous plate of claim 7 wherein said inert powder is carbon black.

17. The porous plate of claim 9 wherein the carbon black is graphitized, is of a uniform size, and is spherical in shape.

18. The porous plate of claim 10 wherein said inert powder is silicon carbide having a variable particle size.

* * * * *

UNITED STATES PATENT AND TRADEMARK OFFICE
CERTIFICATE OF CORRECTION

PATENT NO. : 4,652,502

DATED : March 24, 1987

INVENTOR(S) : Richard D. Breault et. al.

It is certified that error appears in the above-identified patent and that said Letters Patent is hereby corrected as shown below:

Column 11, line 16: after "a" change "viad" to --void--.

Signed and Sealed this

Fourth Day of April, 1989

Attest:

DONALD J. QUIGG

Attesting Officer

Commissioner of Patents and Trademarks